(12) United States Patent
Samaniego

(10) Patent No.: US 7,845,447 B2
(45) Date of Patent: Dec. 7, 2010

(54) SYSTEM AND METHODS FOR ADJUSTMENT OF VEHICLE BODIES

(76) Inventor: Victor Samaniego, 9849 Mission Blvd., Riverside, CA (US) 92509

( * ) Notice: Subject to any disclaimer, the term of this patent is extended or adjusted under 35 U.S.C. 154(b) by 188 days.

(21) Appl. No.: 12/244,642

(22) Filed: Oct. 2, 2008

(65) Prior Publication Data

US 2009/0091096 A1   Apr. 9, 2009

Related U.S. Application Data

(60) Provisional application No. 60/978,129, filed on Oct. 9, 2007.

(51) Int. Cl.
*B62D 33/063* (2006.01)
(52) U.S. Cl. ............... 180/89.13; 180/89.15; 280/6.15
(58) Field of Classification Search .............. 280/6.15, 280/6.155, 6.157, 6.16, 6.151; 180/326, 180/327, 329, 89.13, 89.14, 89.15, 89.17
See application file for complete search history.

(56) References Cited

U.S. PATENT DOCUMENTS

| | | | | |
|---|---|---|---|---|
| 782,520 | A * | 2/1905 | Pearl ........................ | 180/89.15 |
| 2,833,367 | A * | 5/1958 | Pool et al. ................... | 180/329 |
| 3,293,679 | A * | 12/1966 | Murphy ........................ | 15/84 |
| 3,720,047 | A * | 3/1973 | van der Lely ................. | 56/15.6 |
| 4,018,473 | A * | 4/1977 | Chalupsky ............. | 296/190.04 |
| 4,886,214 | A | 12/1989 | Musso | |
| 4,949,805 | A * | 8/1990 | Mather et al. ............... | 180/333 |
| 5,060,334 | A * | 10/1991 | Strauser et al. ................ | 15/84 |
| 6,260,859 | B1 * | 7/2001 | Dixon et al. ............. | 280/5.514 |
| 6,276,750 | B1 * | 8/2001 | Frisch ..................... | 296/190.1 |
| 6,293,562 | B1 * | 9/2001 | Kutscher ................. | 280/6.159 |
| 6,722,669 | B1 * | 4/2004 | Stammreich ............. | 280/5.514 |
| 6,808,057 | B1 * | 10/2004 | Nirmal et al. ............... | 198/312 |
| 7,204,546 | B2 * | 4/2007 | Antonetti ............... | 296/190.04 |
| 7,604,023 | B2 * | 10/2009 | Buckner et al. ........... | 137/899.4 |
| 7,690,473 | B2 * | 4/2010 | Hammonds ................. | 180/326 |
| 2002/0125662 | A1 * | 9/2002 | Magness ...................... | 280/30 |
| 2006/0053582 | A1 * | 3/2006 | Engel et al. ................. | 15/340.1 |
| 2006/0104404 | A1 * | 5/2006 | Blackburn et al. ............ | 377/27 |
| 2006/0180403 | A1 * | 8/2006 | Hanlon ........................ | 187/269 |

\* cited by examiner

*Primary Examiner*—Paul N Dickson
*Assistant Examiner*—Drew Brown
(74) *Attorney, Agent, or Firm*—J. Curtis Edmondson

(57) ABSTRACT

A vehicle body and vehicle frame assembly is disclosed that includes a complete rolling chassis with wheels, motor, drive train, transmission and all other components found in contemporary automotive vehicles with the addition of a scissor lift situated in the center of the vehicle frame that is connected to the chassis frame at the lower end and to the body of the vehicle at the upper end through a frame and turntable device. Controls are used to lower, elevate and rotate the body of the vehicle relative to the chassis, so that observers may readily view the chassis components.

15 Claims, 5 Drawing Sheets

SYSTEM AND METHODS FOR ADJUSTMENT OF VEHICLE BODIES

RELATED APPLICATIONS

This application claims the benefit of and priority to U.S. Provisional Application Ser. No. 60/978,129 filed Oct. 9, 2007 by Victor Galena aka Victor Samaniego, the contents of which are hereby incorporated by reference as if recited in full herein for all purposes.

BACKGROUND

This inventive subject matter relates to vehicle systems in general and to positioning systems for vehicle bodies in particular.

Although cars, trucks and motorized vehicles, are used for transportation and other practical purposes, there is a sector of society that enjoys customizing and displaying vehicles and their special features. People spend thousands of dollars on unique painting jobs, hydraulic systems, custom sound systems, and performance items like wheels, supercharged engines and customized upholstery.

Car enthusiasts gather at events to display their hard work. Many events such as car shows, monster truck shows, "Hot August Nights", and other automotive events are forums where the car enthusiast can display their car.

Typically the car is displayed by opening the hood of the engine compartment to show an attractive engine component. In other cases, the car can be hoisted on a lift to show the underside of the car. In certain special cases, the wheels of the car are so large that the underside of the car is visible without the use of a hoist.

Certain special or unique features of the vehicles cannot be displayed without separating the entire vehicle body from the vehicle frame. These components typically being the top part of the transmission, the drive train, the side part of the engine, etc.

The prior art includes a well known configurations where a portion of the vehicle body separates from a vehicle frame but for a limited and specialized purpose. U.S. Pat. No. 4,886,214 to Musso Jr. (Dec. 12, 1989) illustrates a typical dump truck, where the truck bed is titled away from the vehicle frame and pivots on the end of the truck. As is demonstrated in Musso, Jr. the truck bed does not completely separate from the vehicle chassis or frame, and does not allow the inspection of the engine.

The inventive subject matter proposes a novel way of displaying the internal components of an engine and manipulating the chassis for entertainment purposes.

SUMMARY

The present inventive subject matter discloses a vehicle chassis positioning system having a vehicle body that can be elevated and rotated separately from the vehicle's frame, In one possible embodiment a vehicle chassis positioning system has a vehicle body, where the vehicle body detachable from the vehicle frame; and a vehicle body positioner, the vehicle body positioned interposed between the vehicle body to the vehicle frame; and a positioner control system, the positioner control system electrically connected to the vehicle body positioner, such that the vehicle body that can be elevated and rotated relative to vehicle frame using the positioned control system.

The inventive subject matter has two distinct parts or pieces; one is the vehicle body and the second is the vehicle fram The vehicle frame, has an engine, transmission, drive train, wheels, brakes, exhaust system and all other items normally associated with a motorized vehicle chassis as well as a lifting device mounted in the mid point or center of the frame with a rotating top plate. The lifting device would be a standard heavy-duty hydraulic scissor lift with a turntable or motorize palate that can rotate up to 180 degrees in either direction relative to the frame mounted at one end.

The vehicle body rests on the frame. The rolling chassis's frame will rest or mate on that frame when the lifting device is in the lowered position. The top frame can be secured via quick release clamps so that the vehicle will appear like a normal vehicle and can be driven.

Mounted on the side of the vehicle body is a receptacle or box hitch that allows for the attachment of a boom. The boom houses a removable seat that allows the exhibitioner to operate controls that manipulate the cab, that is raise, lower and rotate it relative to the chassis.

DETAILED DESCRIPTION

While describing the inventive subject matter and its embodiments, various terms will be used for the sake of clarity. These terms are intended to not only include the recited embodiments, but also all equivalents that perform substantially the same function, in substantially the same manner to achieve the same result.

The term "vehicle" is generally considered to be a motorized vehicle that is well known in the arts, including but not limited to, cars, trucks, and three wheel vehicles.

The term "vehicle body" is generally considered to be a metal chassis that is affixed to the top of a vehicle frame. The material used for the chassis may not be limited to metal, rather, those skilled in the arts will recognize that any chassis material may be used, such as plastic, fiberglass, composites, or a combination thereof. Also the vehicle body may be bifurcated or trifurcated, such that certain parts of the vehicle body may be separated, such as, in the case of a pickup truck or a dump truck.

The term "vehicle frame" is generally considered to be a metal chassis that supports the vehicle body. In a typical configuration, the vehicle frame is a rigid or semi rigid structure with four wheels, a drive train connected to the four wheels, and e three wheels.

Figure 1:
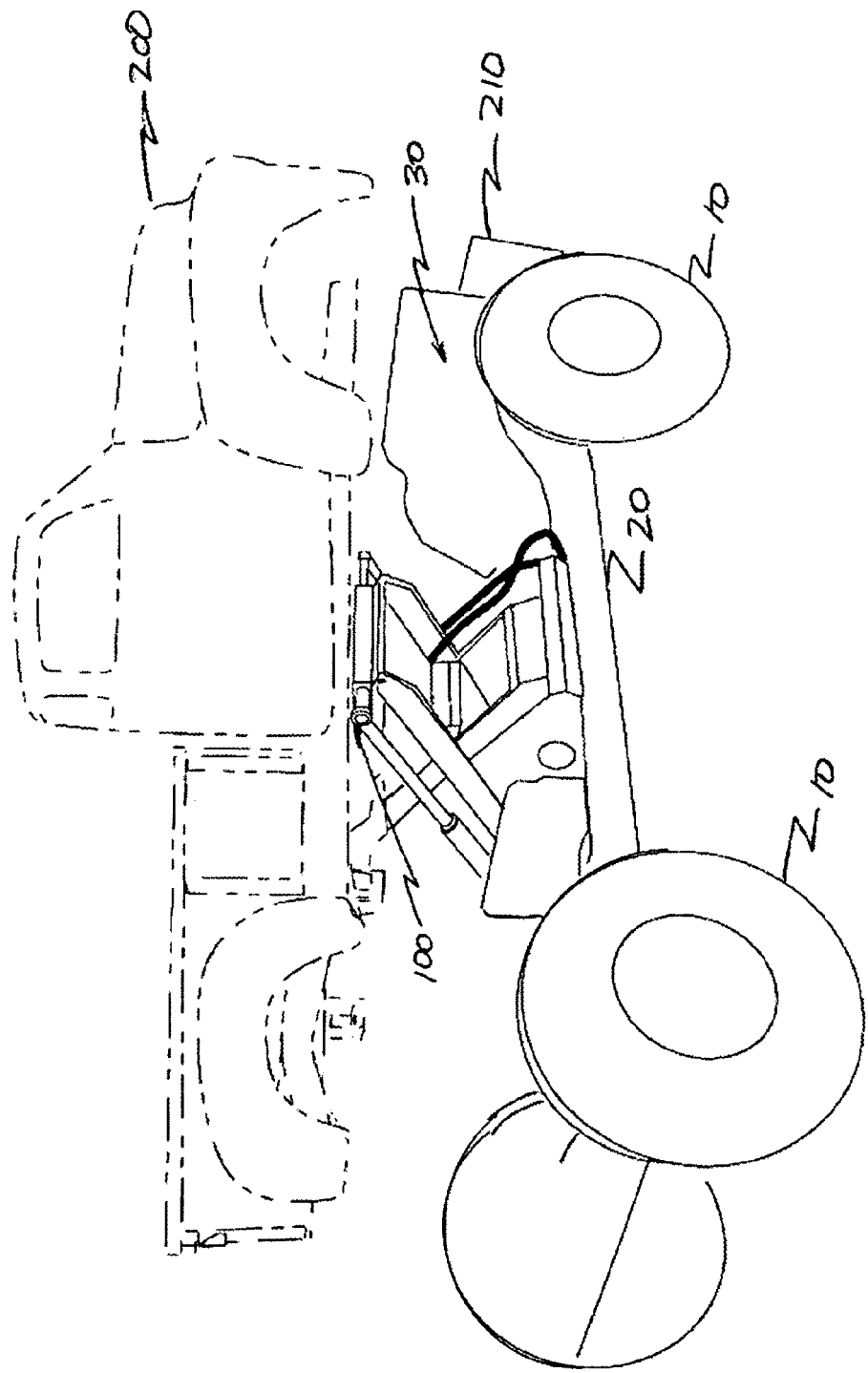
FIG. 1 is a perspective view of the adjustable body system in the elevated and partially rotated position.

An embodiment of the present inventive subject matter discloses a vehicle body system shown in perspective view in FIG. 1 that depicts the vehicle body 200 slightly rotated and elevated relative to the vehicle frame 210. Here we have chosen to depict a truck cab for the purpose of illustrating a vehicle body, but it is clear that a variety of other body styles, such as that of a coupe, bus, station wagon or sedan could easily be understood to be within the scope of the inventive subject matter.

Figure 2:
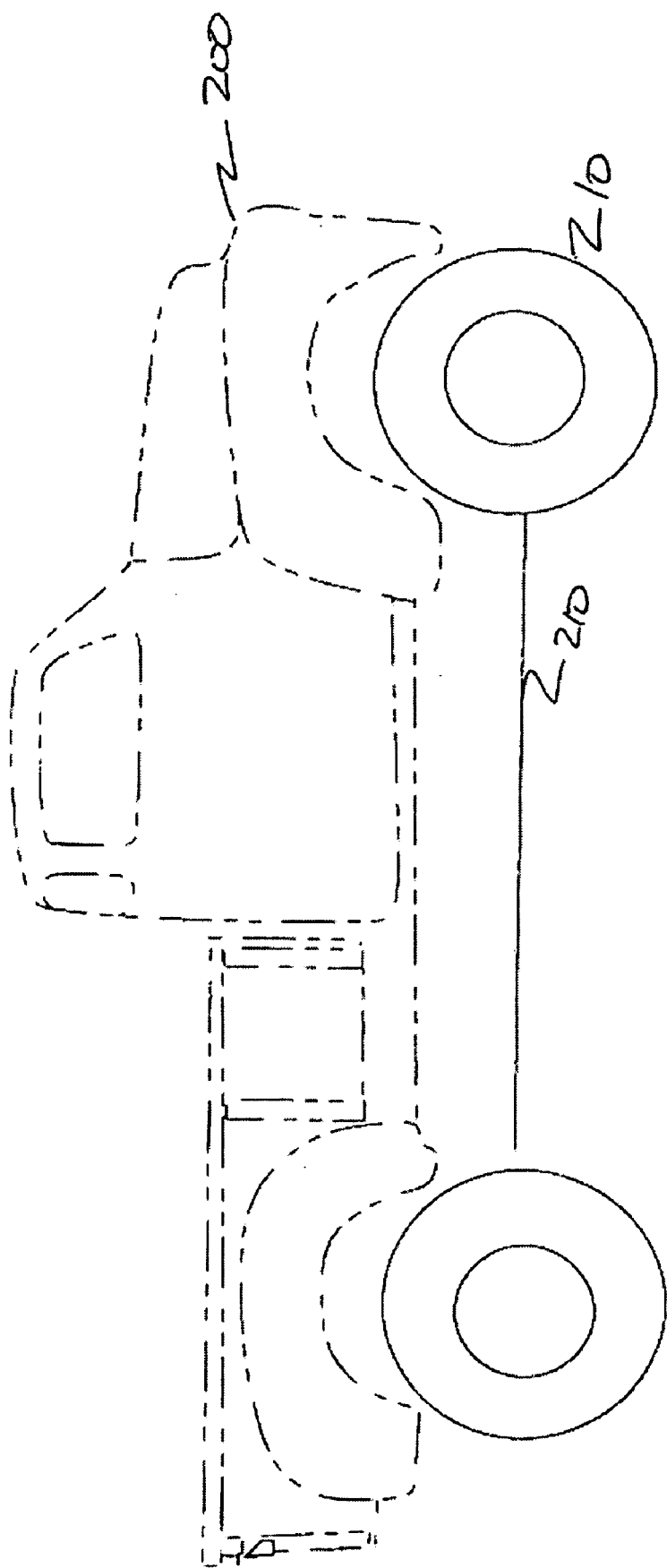
FIG. 2 is a side view of the adjustable body system in the lowered position.

Now referring to FIG. 2 which is a side view of the adjustable vehicle body system in the lowered and centered position giving the appearance of a standard vehicle, that is in this position the lifting and rotating mechanisms are not visible.

Figure 3:
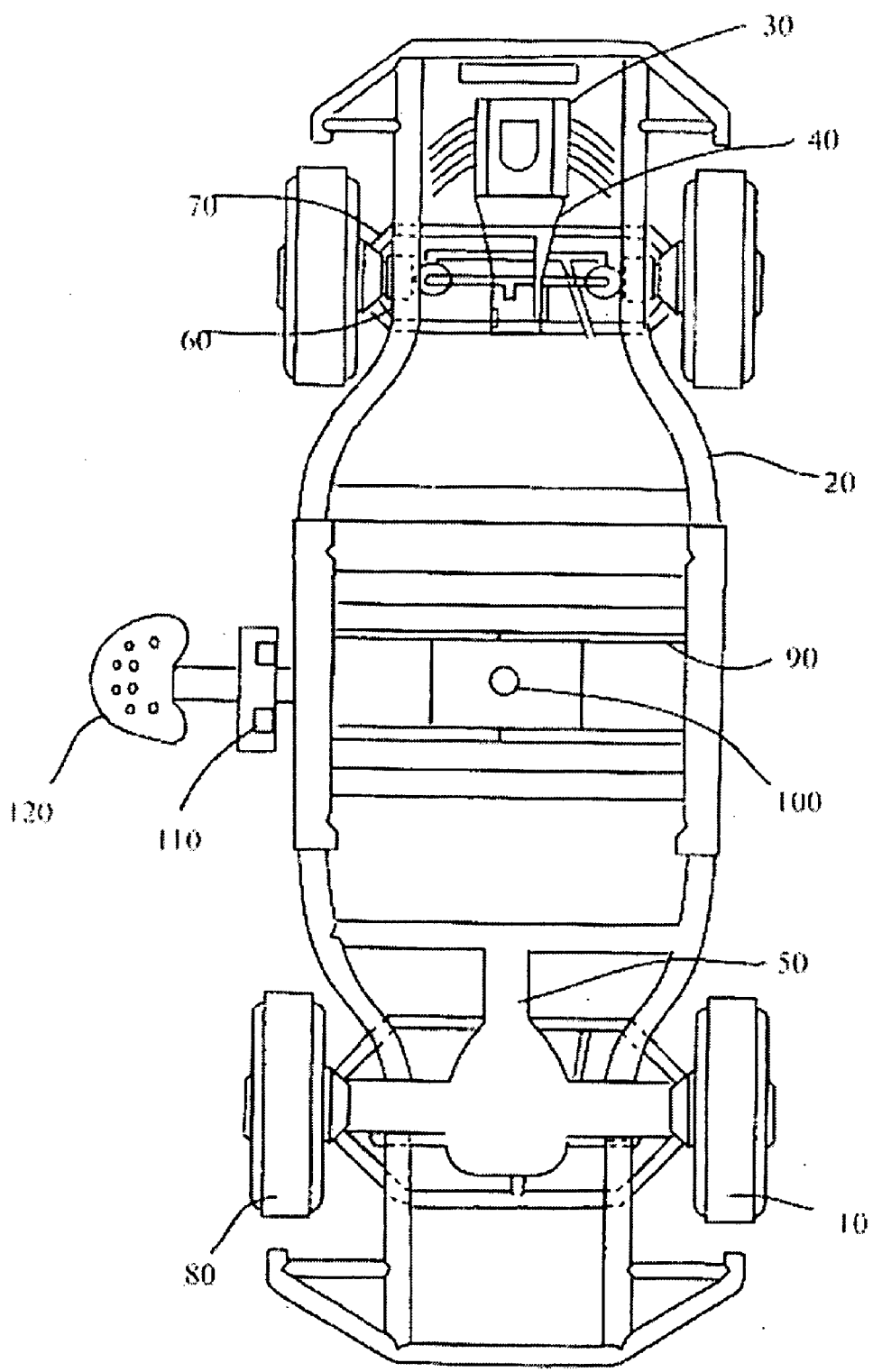
FIG. 3 is a top view of the adjustable body system with the body removed.

Now referring to FIG. 3 is a top view of chassis assembly of the adjustable vehicle body and depicts all of the elements of a traditional automotive chassis that is: wheels 10, frame 20, engine 30, transmission 40, drive train/differential 50, suspension 60, steering control 70, and brakes 80. It also includes a lifting mechanism 90, a motorized turntable 100, control system 110, removable control station 120 and an upper frame or body chassis 130.

The lifting mechanism 90 is depicted as a hydraulic scissors lift due to its compact size and ease of operation and control, however in other embodiments various other lifting mechanisms have been entertained, such as electric scissor lift pillar lift, and/or screw jacks. The purpose of the lifting mechanism is to separate the body chassis 130 of the vehicle from the frame 20 in a relatively horizontal motion. The lifting mechanism 90 can lift the body chassis typically 30 feet into the air, although other set points are contemplated, such as, separation distance ranging from 0 to 3 ft, 0 to 10 ft, 0 to 20 ft, and 0 to 40 ft, and 0 to 50 ft.

The body chassis may also have stabilization devices at the base of the unit to prevent the vehicle from tipping over when the body chassis is separated.

The motorized turntable 100 is mounted and connected to the upper most portion of the lifting mechanism 90 at one end and then affixed to the vehicle body 200 at the other end via frame 210 as depicted in FIG. 1.

The control system 110 is depicted in FIG. 3 as a series of pedals that are operated by a person sitting in the removable control station 120. The control system 110 is a series of mechanical and hydraulic switches that operate the lifting mechanism 90 and the motorized turntable 100. An embodiment of the control system 110 illustrates the use of pedals by the operator. Alternate embodiments of the control system 110 are hand operated controls or a remote control system.

Although the figures depict the body chassis as a truck cab that is separate from the frame using the scissor jack, it is also contemplated that in alternate embodiments different body types or lifting mechanisms may be implemented. It will be evident that various further modifications are possible without departing from the scope of the inventive subject matter as set forth in the following claims.

Figure 4:
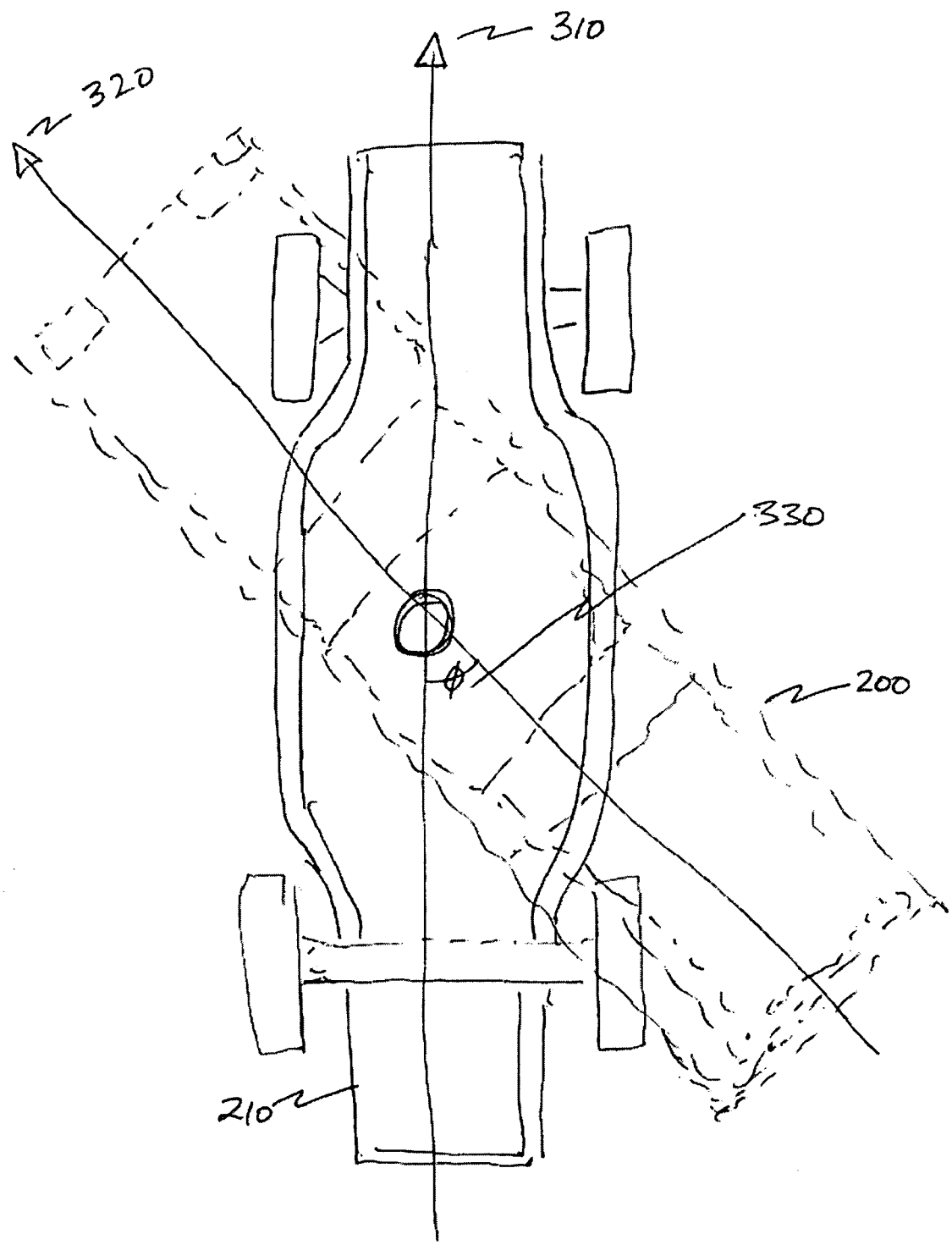
FIG. 4 is a top view showing the rotation of the adjustable body system relative to the vehicle frame.

Now referring to FIG. 4 which depicts a top view of the vehicle frame 210 and the vehicle body 220. The vehicle body 220 is depicted as dashed lines with a center line body axis 320. The vehicle frame 210 is depicted in solid lines with a center line frame axis 310. The angle 330 between the vehicle frame 210 and the vehicle body 220 is created by the motorized turntable. This angle 330 can range from 0 degrees to +/−10 degrees, +/−20 degrees, +/−30 degrees, +/−40 degrees, +/50 degrees, +/−60 degrees, +/−70 degrees, +/−80 degrees, and +/−90 degrees. The angle 330 may also allow for movement from 0 to +/−180 degrees, in which case the vehicle frame is complete rotated backwards relative to the vehicle body.

Figure 5:
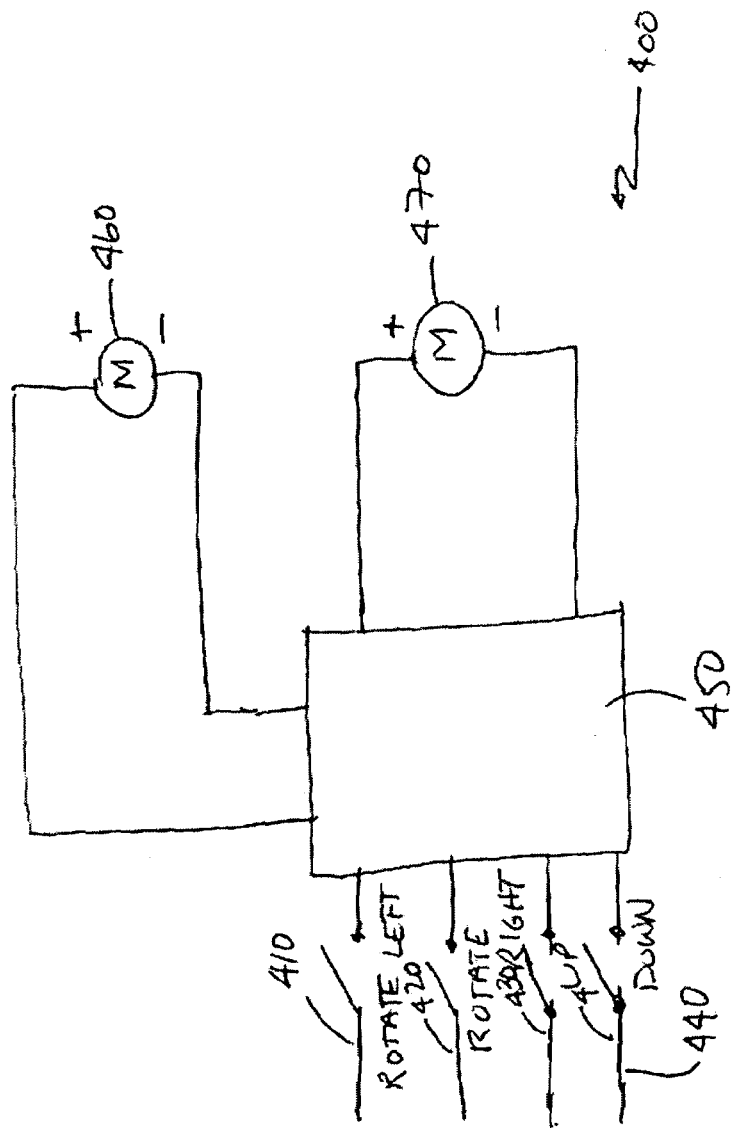
FIG. 5 is a schematic diagram of the control system for the adjustable body system.

Now referring to FIG. 5 which depicts a simplified schematic view of the control system 400. The control system consists of manually operated switches which allow for right 410, left 420, up 430, and down 440 movements. These switches are connected to a control box which engages a right/left motor 460 and an up/down motor 470. It is understood to those trained in the arts that electric motors may be replaced by hydraulic or gas positioning devices.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

What is claimed is:

1. A vehicle chassis positioning system comprising
   a vehicle body, the vehicle body detachable from the vehicle frame;
   a vehicle body positioner, the vehicle body positioner interposed between the vehicle body and the vehicle frame; the vehicle body positioner further comprising a lifting mechanism;
   a positioner control system, the positioner control system electrically connected to the vehicle body positioner, and
   a boom, the boom including a seat, the seat being located approximately perpendicular to the frame, and the length of the boom being from 1 to 10 ft in distance;
   such that the vehicle body can be elevated and rotated relative to vehicle frame using the positioner control system.

2. The vehicle chassis positioning system of claim 1 wherein the vehicle body positioner further comprises
   an elevator, the elevator configured to operably separate the vehicle body from the vehicle frame.

3. The vehicle chassis positioning system of claim 2 where the elevator is configured to separate the vehicle from 0 to 10 ft.

4. The vehicle chassis positioning system of claim 2 wherein the elevator is configured to separate the vehicle body from 0 to 20 ft.

5. The vehicle chassis positioning system of claim 2 wherein the elevator is configured to separate the vehicle body from 0 to 30 ft.

6. The vehicle chassis positioning system of claim 1 wherein the vehicle body positioner further comprises a rotator, the rotator is configured to operably rotate the vehicle body relative to the vehicle frame.

7. The vehicle chassis positioning system of claim 6 wherein the rotation of the rotator is from −30 to +30 degrees relative to the vehicle frame.

8. The vehicle chassis positioning system of claim 6 wherein the rotation of the rotator is from −60 to +60 degrees relative to the vehicle frame.

9. The vehicle chassis positioning system of claim 6 wherein the rotation of the rotator is from −90 to +90 degrees relative to the vehicle frame.

10. The vehicle chassis positioning system of claim 6 where the rotation of the rotator is from −120 to +120 degrees relative to the vehicle frame.

11. The vehicle chassis positioning system of claim 6 wherein the rotation of the rotator is from −180 to +180 degrees relative to the vehicle frame.

12. The vehicle of claim 6 wherein the rotator is an electrical motor.

13. The vehicle of claim 6 wherein the rotator is a hydraulic positioning system.

14. The vehicle of claim 1 wherein the lifting mechanism is a scissors lift.

15. The vehicle of claim 1 wherein the lifting mechanism is a hydraulic lift.

* * * * *